UNITED STATES PATENT OFFICE.

CARLETON ELLIS, OF BOSTON, MASSACHUSETTS, ASSIGNOR TO NATHANIEL L. FOSTER, TRUSTEE, OF BROOKLINE, MASSACHUSETTS.

SOLDER FOR ALUMINIUM.

No. 863,058.      Specification of Letters Patent.      Patented Aug. 13, 1907.

Application filed January 12, 1904. Serial No. 188,735.

*To all whom it may concern:*

Be it known that I, CARLETON ELLIS, of Boston, in the county of Suffolk and State of Massachusetts, have invented certain new and useful Improvements in Solder for Aluminium, of which the following is a specification.

The object of this invention is to provide a solder for aluminium which shall be strong and durable, shall be of low fusing point and shall unite easily with aluminium. My solder consists of an alloy of tin, zinc, aluminium and manganese. Tin is the constituent used in greatest relative amount. The manganese is added only in relatively small quantity. This latter ingredient is used to improve the texture of the solder and to increase the durability of the soldered joint. Chromium may be added to the solder if desired.

Suitable proportions for a satisfactory solder are tin 30 parts, zinc 7 parts, aluminium $\frac{3}{4}$ part, manganese $\frac{1}{10}$ part, or using chromium with manganese, tin 30 parts, zinc 8 parts, aluminium 1 part, manganese q. s., chromium $\frac{1}{15}$ part.

I do not limit myself to the exact formulæ as given above. These proportions may be varied to a considerable degree without materially affecting the action of the solder. The ratio of zinc to tin is especially capable of variation.

The solder may be prepared by fusing together the above described elements. If desired the manganese or chromium may be added in the form of their respective aluminum alloys. To secure the best results the fusion should be made in a closed crucible, as free access of air to the fused alloy appears to injure the working qualities of the resulting solder.

What I claim as my invention and desire to secure by Letters Patent is

1. Solder for aluminium consisting of tin, zinc, aluminium and manganese.

2. Soldering composition which consists largely of tin, zinc and aluminium associated with a modicum of manganese.

In testimony whereof I have affixed my signature, in presence of two witnesses.

CARLETON ELLIS.

Witnesses:
    FREDERIC G. CHISHOLM,
    MAJOR WILLIAM BARBER.